M. L. SWOFFORD.
MOTOR DRIVEN HEADER AND BINDER.
APPLICATION FILED NOV. 14, 1916.
1,263,001.
Patented Apr. 16, 1918.
3 SHEETS—SHEET 1.
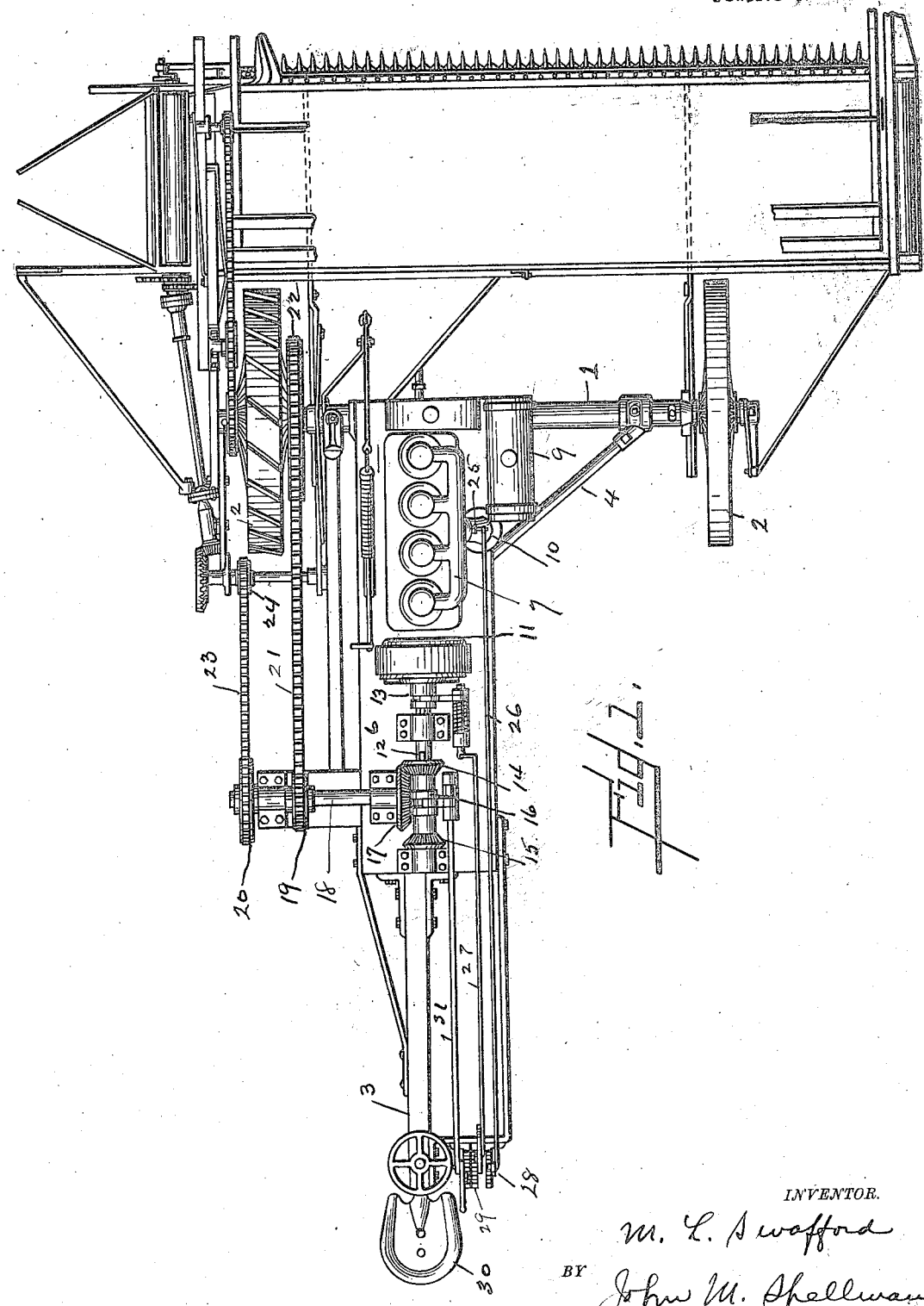
INVENTOR.
M. L. Swofford
BY John M. Spellman
ATTORNEY.

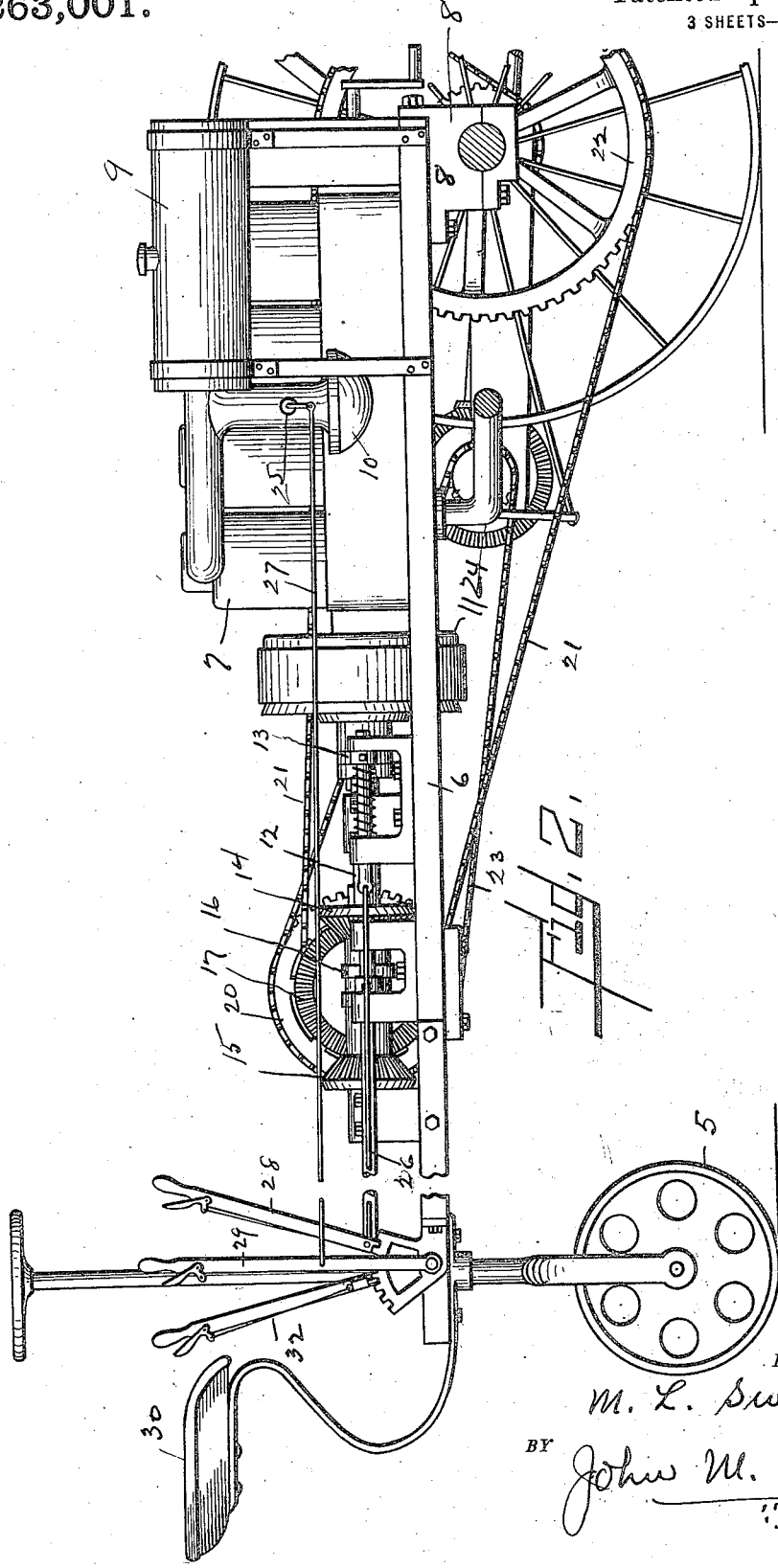

M. L. SWOFFORD.
MOTOR DRIVEN HEADER AND BINDER.
APPLICATION FILED NOV. 14, 1916.
1,263,001.
Patented Apr. 16, 1918.
3 SHEETS—SHEET 3.
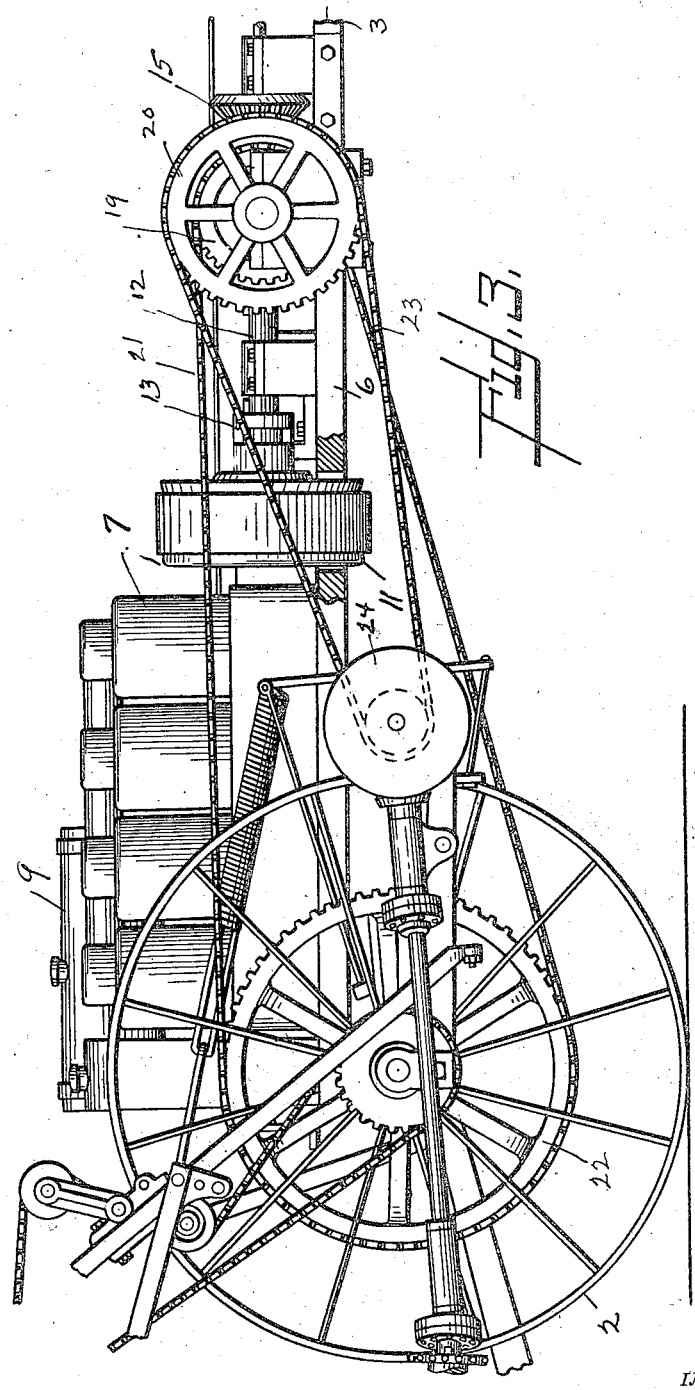
INVENTOR
M. L. Swofford.
BY John M. Spellman
ATTORNEY.

UNITED STATES PATENT OFFICE.

MARVIN L. SWOFFORD, OF JUSTIN, TEXAS.

MOTOR-DRIVEN HEADER AND BINDER.

1,263,001.    Specification of Letters Patent.    Patented Apr. 16, 1918.

Application filed November 14, 1916. Serial No. 131,221.

*To all whom it may concern:*

Be it known that I, MARVIN L. SWOFFORD, a citizen of the United States, residing at Justin, in the county of Denton and State of Texas, have invented certain new and useful Improvements in Motor-Driven Headers and Binders, of which the following is a specification.

My invention has relation to that class of farming implements known as combined headers, binders and harvesters which are arranged to be pushed through the field of grain to be cut, bound and harvested and in such connection it relates more particularly to the arrangement and construction of such an implement in so far as such construction and arrangement permits of the use of an engine or motor mounted upon the frame of an implement for the driving of the mechanisms as well as the propulsion of the implement.

Heretofore in implements of this class the motive power was a team of horses, mules or oxen and the power for driving the various heading, binding, stacking, etc., mechanisms was derived by chain connection from one or both of the tractor wheels of the vehicle.

It is the main object of my invention to provide in such an implement a gasolene or similar engine mounted upon the main frame work of the vehicle and partly supported upon the main axle of said vehicle and to provide in conjunction with said engine certain means and connections whereby the engine may drive the tractor wheels of the implement and drive the means for operating the various mechanisms of the implement.

Broadly speaking the present invention resides first in the provision of means or structure for supporting the engine partly upon the main axle of the implement and partly upon the main frame work of the implement; second in the provision of means whereby the engine may drive the implement and the mechanisms of the implement through separate and independent means; and third, as a necessary part of the second subdivision of invention, the provision of means or structure whereby the operation of the engine, the driving of the implement and the driving of the mechanisms of said implement may be controlled by the driver upon the seat at the rear of the implement.

The nature and scope of my invention will be more fully understood from the following description taken in connection with the accompanying drawings forming part hereof, in which—

Figure 1, is a top or plan view of a combined header and binder embodying the main features of my invention.

Fig. 2, is a longitudinal sectional view of the implement designed to illustrate one side of the motor and auxiliaries in elevation, and Fig. 3, is an elevational view of the opposite side of the implement.

Referring to the drawings 1 represents the front axle upon which are mounted the tractor wheels 2. The usual rearwardly extending pole or shaft 3 is supported by the axle through the brace bar 4 and said pole 3 at the rear end of the implement is supported on the rear or steering wheel 5.

The pole 3, brace bar 4 and axle 1 serve as supports for a longitudinally extending frame or platform 6 upon which is mounted an explosion engine 7 of the usual gasolene or motor type. This platform 6 is supported at the front end by blocks 8 interposed between said platform 6 and the axle 1 and it forms an integral part of, or is rigidly secured to, the intermediate portion of the pole 3. An oil tank 9 supported by the platform 6 is arranged at one side of the engine and is designed to feed the carbureter 10 of said engine.

The main or fly wheel shaft 11 of engine 7 is brought into and out of operative connection with a driving shaft 12 by means of a clutch 13. The driving shaft 12 is provided at its rear end with two oppositely disposed miter gears 14 and 15 arranged to be shifted on the shaft 12 by means of the clutch 16. Either miter gear 14 or 15 may thus be brought into mesh with a miter gear 17 arranged on the end of a counter shaft 18 extending at right angles to the driving shaft 12. This counter shaft 18 is provided with two sprockets 19 and 20. As illustrated the sprockets 19 and 20 are keyed onto said shaft 18 and both are driven when the miter gear 17 of shaft 18 is in mesh with one or the other of the miter gears 14 and 15 of shaft 12. These shifting gears 14 and 15 form a means for reversing the motion of counter shaft 18.

Sprocket 19 of counter shaft 18 is connected by chain 21 with a sprocket 22 connected to and driving one of the tractor wheels 2, while sprocket 20 is connected by chain 23 with the usual shaft 24 for driving the various heading, binding, etc., mechanisms of the implement.

Throttle 25 and clutch 13 of the engine are each connected by the rods, 26 and 27 respectively, with a hand lever 28 and 29 adjacent to the driver's seat 30 above the steering wheel 5.

The clutch 16 is likewise operated by rod 31 controlled by hand lever 32 at the driver's seat 30.

Having thus described the nature and objects of my invention what I claim as new and desire to secure by Letters Patent, is—

In a farm implement of the character described, a pole for pushing the implement, an axle connected to the front end of the pole, tractor wheels turning on said axle, a steering wheel supporting the rear end of said pole, and a seat arranged above the steering wheel, combined with a platform forming substantially a portion of the pole, blocks supporting the front end of said platform upon the axle, an engine of the gasolene type supported on said platform, a means controlled by the engine for driving the tractor wheels of the implement, an independent means controlled by said engine for operating the various mechanisms of the implement, means arranged adjacent to the seat for controlling the operation of the engine, and means arranged adjacent to said seat for controlling respectively the driving of the tractor wheels and the various mechanisms of the implement.

In testimony whereof I have signed my name to this specification.

MARVIN L. SWOFFORD.